US012617716B2

(12) United States Patent
Li et al.

(10) Patent No.: US 12,617,716 B2
(45) Date of Patent: May 5, 2026

(54) VISIBLE LIGHT-CATALYZED TRANSLUCENT CONCRETE, AND PREPARATION METHOD AND USE THEREOF

(71) Applicants: KUNMING UNIVERSITY OF SCIENCE AND TECHNOLOGY, Kunming (CN); YUNNAN BLUE ENVIRONMENTAL ENGINEERING TECH CO., LTD., Kunming (CN); JIANGXI BLUE ENVIRONMENTAL ENGINEERING TECH CO., LTD., Pingxiang (CN)

(72) Inventors: Kai Li, Kunming (CN); Xin Sun, Kunming (CN); Chunxue Wang, Kunming (CN); Jie Yang, Kunming (CN); Fei Wang, Kunming (CN); Chi Wang, Kunming (CN); Yixing Ma, Kunming (CN); Yuan Li, Kunming (CN); Lei Shi, Kunming (CN); Siyang Li, Kunming (CN)

(73) Assignees: KUNMING UNIVERSITY OF SCIENCE AND TECHNOLOGY, Kunming (CN); YUNNAN BLUE ENVIRONMENTAL ENGINEERING TECH CO., LTD., Kunming (CN); JIANGXI BLUE ENVIRONMENTAL ENGINEERING TECH CO., LTD., Pingxiang (CN)

( * ) Notice: Subject to any disclaimer, the term of this patent is extended or adjusted under 35 U.S.C. 154(b) by 323 days.

(21) Appl. No.: 18/339,133

(22) Filed: Jun. 21, 2023

(65) Prior Publication Data

US 2023/0416145 A1 Dec. 28, 2023

(51) Int. Cl.
*C04B 7/153* (2006.01)
*B28B 1/52* (2006.01)
(Continued)

(52) U.S. Cl.
CPC ............ *C04B 7/1535* (2013.01); *B28B 1/522* (2013.01); *C04B 7/365* (2013.01); *C04B 7/43* (2013.01);
(Continued)

(58) Field of Classification Search
CPC ......... C04B 7/1535; C04B 7/365; C04B 7/43; C04B 2103/408; C04B 2103/44;
(Continued)

(56) References Cited

U.S. PATENT DOCUMENTS

2022/0306531 A1* 9/2022 Zhang ..................... C04B 28/04

FOREIGN PATENT DOCUMENTS

CN 106478029 A 3/2017
CN 107176820 A * 9/2017 ............. C04B 26/32
(Continued)

OTHER PUBLICATIONS

English translation of CN-111236526-A by EPO. (Year: 2020).*
(Continued)

*Primary Examiner* — Xiao S Zhao
*Assistant Examiner* — Inja Song
(74) *Attorney, Agent, or Firm* — Thomas | Horstemeyer, LLP

(57) ABSTRACT

The present disclosure relates to a visible light-catalyzed translucent concrete, and a preparation method and use thereof. The preparation method includes: extracting an iron oxide from a copper slag, mixing the iron oxide with $TiO_2$ to obtain a photocatalyst, and then mixing the photocatalyst with an additive to obtain a photocatalytic slurry; preparing a concrete slurry using the copper slag after iron extraction
(Continued)

as an aggregate; and pouring the photocatalytic slurry, the concrete slurry, and the photocatalytic slurry in sequence into a mold pre-laid with an optical fiber, to obtain the visible light-catalyzed translucent concrete. In the visible light-catalyzed translucent concrete, iron in the copper slag is used as a part of raw materials of the photocatalyst, and the copper slag after iron extraction is used as an aggregate to replace natural sand and gravel. This solves environmental pollutions caused by the copper slag and realizes resource utilization.

10 Claims, 1 Drawing Sheet

(51) Int. Cl.

| | | |
|---|---|---|
| *C04B 7/36* | (2006.01) |
| *C04B 7/43* | (2006.01) |
| *C04B 103/40* | (2006.01) |
| *C04B 103/44* | (2006.01) |
| *C04B 111/00* | (2006.01) |
| *C04B 111/80* | (2006.01) |

(52) U.S. Cl.
CPC .... *C04B 2103/408* (2013.01); *C04B 2103/44* (2013.01); *C04B 2111/00827* (2013.01); *C04B 2111/805* (2013.01)

(58) Field of Classification Search
CPC ..... C04B 2111/00827; C04B 2111/805; C04B 2111/00612; C04B 2111/2061; C04B 2111/80; C04B 28/02; C04B 28/24; C04B 28/04; C04B 2111/00017; C04B 2201/50; C04B 14/305; C04B 14/308; C04B 24/42; C04B 22/16; C04B 22/002; C04B 20/0048; C04B 18/144; C04B 2103/302; B28B 1/522; B28B 13/022; B28B 23/0037; E04C 1/42; E04C 2/54; Y02W 30/91; B01J 23/002; B01J 23/745; B01J 2523/00; B01J 2523/17; B01J 2523/47; B01J 2523/842

See application file for complete search history.

(56) References Cited

FOREIGN PATENT DOCUMENTS

| | | | | | | |
|---|---|---|---|---|---|---|
| CN | 111236526 | A | * | 6/2020 | ............... | B28B 1/50 |
| CN | 111470786 | A | * | 7/2020 | ............. | C04B 28/00 |
| CN | 112917642 | A | * | 6/2021 | ......... | B28B 17/0081 |
| CN | 113372086 | A | | 9/2021 | | |
| KR | 20210007219 | A | * | 1/2021 | ......... | C04B 20/1066 |

OTHER PUBLICATIONS

English translation of CN 107176820 A by EPO. (Year: 2017).*
English translation of KR-20210007219-A by EPO. (Year: 2021).*
Chanhom et al., "Colloidal titania-silica-iron oxide nanocomposites and the effect from silica thickness on the photocatalytic and bactericidal activities", J. of Magnetism and Magnetic Materials, 427, 54-59, 2017; available at https://www.sciencedirect.com/science/article/pii/S0304885316327378#f0035. (Year: 2017).*
English translation of CN-112917642-A by EPO. (Year: 2021).*
English translation of CN-111470786-A by EPO. (Year: 2020).*
Huazhong, Liu , "A First-Principles Computation: The Surfaces of TiO2", Chinese Version Library CIP Data Verification, No. 103227, 2017, 8 pages (4 pages of English Translation and 4 pages of Official Copy).

* cited by examiner

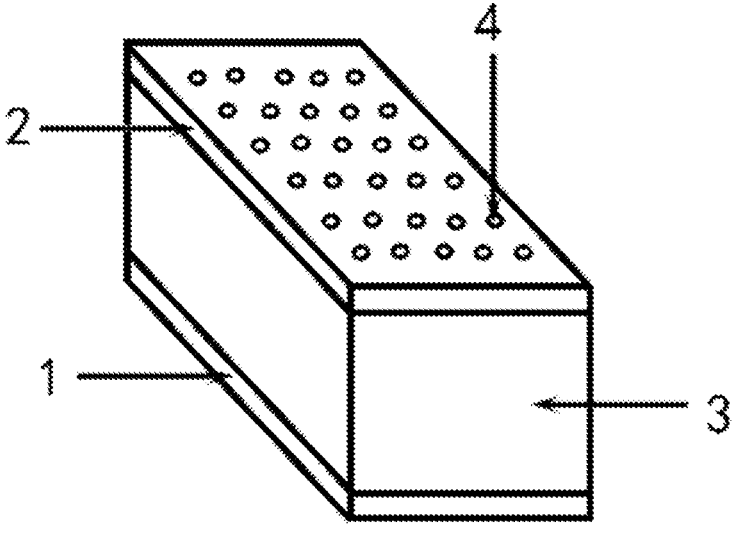

VISIBLE LIGHT-CATALYZED TRANSLUCENT CONCRETE, AND PREPARATION METHOD AND USE THEREOF

CROSS REFERENCE TO RELATED APPLICATION

This patent application claims the benefit and priority of Chinese Patent Application No. 202210727517.5, filed with the China National Intellectual Property Administration on Jun. 24, 2022, the disclosure of which is incorporated by reference herein in its entirety as part of the present application.

TECHNICAL FIELD

The present disclosure belongs to the technical field of solid waste treatment, and in particular relates to a visible light-catalyzed translucent concrete, and a preparation method and use thereof.

BACKGROUND

Copper slag is an industrial solid waste produced during the copper smelting. According to statistics, there is copper slag piled up at present that has exceeded 50 million tons, occupying a large amount of land resources. Moreover, toxic and harmful heavy metal particles in the copper slag are easily leached during the stacking and migrate to the soil, rivers, and air, causing serious environmental pollutions.

As a compound ore metallurgical slag containing valence metal compounds, copper slag has large quantity, low particle size, various types, and complex composition. The copper slag contains various valuable metals such as Fe, Cu, Zn, Pb, Co, and Ni, and a small amount of precious metals such as Au and Ag. Copper slag has not less than 35% of Fe element, which mainly exists in the form of fayalite ($2FeO \cdot SiO2$) and a small amount of magnetite ($Fe_3O_4$). Cu element in the copper slag mainly exists in the form of chalcocite ($Cu_2S$), metallic copper, and copper oxide.

At present, the copper slag is generally treated through traditional ore dressing to conduct iron separation. However, the composition and structure of copper slag make iron ore concentrate unable to be used directly due to low yield, high silicon content, and poor quality. This results in that the copper slag has an iron utilization rate of less than 1%, and a copper slag recycling rate of less than 12%.

SUMMARY

An objective of the present disclosure is to provide a visible light-catalyzed translucent concrete, and a preparation method and use thereof. In the present disclosure, the visible light-catalyzed translucent concrete not only realizes the full resource utilization of copper slag, but also can effectively degrade harmful gases such as $NO_x$, $SO_2$, and HCHO in the air, thereby achieving air purification.

To achieve the above objective, the present disclosure provides the following technical solutions:

The present disclosure provides a preparation method of a visible light-catalyzed translucent concrete, including the following steps:

mixing and grinding a copper slag and an alkaline activator to obtain a mixture, and heating the mixture to conduct thermal activation to obtain an activated slag;

subjecting the activated slag to magnetic separation to obtain an iron oxide and a copper slag tailing;

impregnating the iron oxide and titanium dioxide in a polar solvent to obtain an impregnation dispersion, removing the solvent from the impregnation dispersion, and conducting roasting to obtain a $TiO_2$-doped photocatalyst;

mixing the $TiO_2$-doped photocatalyst, an adhesive, a silane coupling agent, a dispersant, a thickener, and water to obtain a photocatalytic slurry;

mixing the copper slag tailing, cement, a water reducer, and water to obtain a concrete slurry; and pouring the photocatalytic slurry, the concrete slurry, and the photocatalytic slurry in sequence into a mold pre-laid with an optical fiber, to form a first photocatalytic slurry layer, a concrete slurry layer, and a second photocatalytic slurry layer that are sequentially laminated, wherein the optical fiber penetrates the first photocatalytic slurry layer, the concrete slurry layer, and the second photocatalytic slurry layer; and conducting solidification and demolding to obtain the visible light-catalyzed translucent concrete.

Preferably, the alkaline activator includes an alkali metal carbonate and/or an alkaline earth metal oxide; and the copper slag and the alkaline activator are at a mass ratio of 10:(0.5-2).

Preferably, the thermal activation is conducted at 900° C. to 1,200° C. for 1 h to 3 h.

Preferably, the magnetic separation is conducted at a magnetic field intensity of 160 kA/m to 480 kA/m.

Preferably, the iron oxide and the titanium dioxide are at a mass ratio of (10-30):(80-110); the impregnating is conducted for 1 h to 3 h; and the roasting is conducted at 400° C. to 600° C. for 2 h to 4 h.

Preferably, the photocatalytic slurry includes the following components in parts by weight:

5 parts to 10 parts of the $TiO_2$-doped photocatalyst, 30 parts to 60 parts of the adhesive, 0.5 parts to 2 parts of the silane coupling agent, 0.2 parts to 0.6 parts of the dispersant, 0.5 parts to 1.2 parts of the thickener, and 5 parts to 12 parts of water.

Preferably, the concrete slurry includes the following components in parts by weight:

60 parts to 80 parts of the copper slag tailing, 10 parts to 18 parts of the cement, 0.3 parts to 2 parts of the water reducer, and 200 parts to 350 parts of water.

The present disclosure further provides a visible light-catalyzed translucent concrete prepared by the preparation method, including a first photocatalytic layer, an intermediate translucent concrete layer, and a second photocatalytic layer that are sequentially laminated, and further including an optical fiber penetrating the first photocatalytic layer, the intermediate translucent concrete layer, and the second photocatalytic layer.

Preferably, the first photocatalytic layer and the second photocatalytic layer have independently a thickness of 10 mm to 30 mm, and the intermediate translucent concrete layer has a thickness of 150 mm to 450 mm.

The present disclosure further provides use of the visible light-catalyzed translucent concrete as a building wall.

The present disclosure provides a preparation method of a visible light-catalyzed translucent concrete, including the following steps: mixing and grinding a copper slag and an alkaline activator to obtain a mixture, and heating the mixture to conduct thermal activation to obtain an activated slag; subjecting the activated slag to magnetic separation to obtain an iron oxide and a copper slag tailing; impregnating the iron oxide and titanium dioxide in a polar solvent to obtain an impregnation dispersion, removing the solvent from the impregnation dispersion, and conducting roasting to obtain a $TiO_2$-doped photocatalyst; mixing the $TiO_2$-doped photocatalyst, an adhesive, a silane coupling agent, a dispersant, a thickener, and water to obtain a photocatalytic slurry; mixing the copper slag tailing, cement, a water reducer, and water to obtain a concrete slurry; and pouring the photocatalytic slurry, the concrete slurry, and the photocatalytic slurry in sequence into a mold pre-laid with an optical fiber, to form a first photocatalytic slurry layer, a concrete slurry layer, and a second photocatalytic slurry layer that are sequentially laminated, wherein the optical fiber penetrates the first photocatalytic slurry layer, the concrete slurry layer, and the second photocatalytic slurry layer; and conducting solidification and demolding to obtain the visible light-catalyzed translucent concrete. In the present disclosure, fayalite in the copper slag is reduced into an iron oxide using an alkaline activator by thermal activation. The iron oxide is reclaimed by magnetic separation, and then roasted and doped in $TiO_2$ to form a $TiO_2$-doped photocatalyst. The iron oxide in the $TiO_2$-doped photocatalyst, as a doping impurity, can become a trap for photo-generated carriers, and prolong a life of the carriers, thus improving a photocatalytic activity of the $TiO_2$. Meanwhile, a remaining copper slag tailing after iron extraction of an activated slag is used as a coarse or fine aggregate that plays a supporting role in the concrete. After being mixed and gelled with cement, heavy metals in the copper slag tailing are effectively wrapped. In this way, not only solidification and stabilization of the heavy metals can be achieved, but also an amount of the cement can be reduced. Finally, an obtained concrete slurry containing the copper slag tailing is poured into an intermediate translucent concrete layer, and an obtained photocatalytic slurry is poured into two photocatalytic layers arranged on both sides of the intermediate translucent concrete layer. In addition, light transmittance of the visible light-catalyzed translucent concrete is enhanced by a penetrating optical fiber, and an efficiency of a photocatalytic layer is enhanced to degrade harmful gases such as $NO_x$, $SO_2$, and HCHO in the air using sunlight.

The present disclosure provides a visible light-catalyzed translucent concrete prepared by the preparation method, including a first photocatalytic layer, an intermediate translucent concrete layer, and a second photocatalytic layer that are sequentially laminated, and further including an optical fiber penetrating the first photocatalytic layer, the intermediate translucent concrete layer, and the second photocatalytic layer. In the present disclosure, the visible light-catalyzed translucent concrete realizes the full resource utilization of copper slag, and effectively degrades harmful gases such as $NO_x$, $SO_2$, and HCHO in the air, thereby showing a wide application value.

BRIEF DESCRIPTION OF THE DRAWINGS

FIG. 1 shows a schematic structural view of a visible light-catalyzed translucent concrete prepared by a preparation method provided in an example of the present disclosure; where in FIG. 1, 1 represents a first photocatalytic layer, 2 represents a second photocatalytic layer, 3 represents an intermediate translucent concrete layer, and 4 represents an optical fiber.

DETAILED DESCRIPTION OF THE EMBODIMENTS

The present disclosure provides a preparation method of a visible light-catalyzed translucent concrete, including the following steps:

mixing and grinding a copper slag and an alkaline activator to obtain a mixture, and heating the mixture to conduct thermal activation to obtain an activated slag;

subjecting the activated slag to magnetic separation to obtain an iron oxide and a copper slag tailing;

impregnating the iron oxide and titanium dioxide in a polar solvent to obtain an impregnation dispersion, removing the solvent from the impregnation dispersion, and conducting roasting to obtain a $TiO_2$-doped photocatalyst;

mixing the $TiO_2$-doped photocatalyst, an adhesive, a silane coupling agent, a dispersant, a thickener, and water to obtain a photocatalytic slurry;

mixing the copper slag tailing, cement, a water reducer, and water to obtain a concrete slurry; and pouring the photocatalytic slurry, the concrete slurry, and the photocatalytic slurry in sequence into a mold pre-laid with an optical fiber, to form a first photocatalytic slurry layer, a concrete slurry layer, and a second photocatalytic slurry layer that are sequentially laminated, wherein the optical fiber penetrates the first photocatalytic slurry layer, the concrete slurry layer, and the second photocatalytic slurry layer; and conducting solidification and demolding to obtain the visible light-catalyzed translucent concrete.

In the present disclosure, unless otherwise specified, all raw materials/components for preparation are commercially available products well known to those skilled in the art.

In the present disclosure, a copper slag and an alkaline activator are mixed and ground to obtain a mixture, and the mixture was heated to conduct thermal activation to obtain an activated slag.

In the present disclosure, the copper slag is preferably a solid waste produced in the matte smelting and/or a solid waste produced in the converting of copper matte.

In the present disclosure, the alkaline activator includes preferably an alkali metal carbonate and/or an alkaline earth metal oxide, more preferably $Na_2CO_3$ and/or CaO.

In the present disclosure, the copper slag and the alkaline activator are at a mass ratio of preferably 10:(0.5-2), more preferably 10:(0.8-1.5).

In the present disclosure, there is no special requirement for a specific implementation process of the mixing and grinding.

In the present disclosure, the thermal activation is preferably conducted in a muffle furnace. There is no special requirement for a specific implementation process of the heating.

In the present disclosure, the thermal activation is conducted at preferably 900° C. to 1,200° C., more preferably 950° C. to 1,150° C.

In the present disclosure, the thermal activation is conducted for preferably 1 h to 3 h, more preferably 1.5 h to 2.5 h.

In the present disclosure, during the thermal activation, iron-containing compounds in the copper slag are reduced to obtain the iron oxide under a reducing action of the alkaline activator.

In the present disclosure, the activated slag is subjected to magnetic separation to obtain an iron oxide and a copper slag tailing.

In the present disclosure, during the magnetic separation, the activated slag has a particle size of preferably less than 48 μm.

In the present disclosure, the activated slag is preferably subjected to a pretreatment before the magnetic separation. The pretreatment includes preferably: conducting grinding and sieving successively. There is no special requirement for a specific implementation process of the grinding, and the sieving is preferably conducted with a 300-mesh sieve.

In the present disclosure, the magnetic separation is preferably conducted in a magnetic separator.

In the present disclosure, the magnetic separation is conducted at a magnetic field intensity of preferably 160 kA/m to 480 kA/m, more preferably 165 kA/m to 470 kA/m.

In the present disclosure, the iron oxide and titanium dioxide are impregnated in a polar solvent to obtain an impregnation dispersion, the solvent is removed from the impregnation dispersion, and roasting is conducted to obtain a $TiO_2$-doped photocatalyst.

In the present disclosure, the polar solvent is preferably water.

In the present disclosure, the iron oxide and the titanium dioxide are at a mass ratio of preferably (10-30):(80-110), more preferably (12-25):(85-107).

In the present disclosure, a total mass of the iron oxide and the titanium dioxide and a volume of the polar solvent are at a ratio of preferably 1 g:40 mL.

In the present disclosure, the impregnating is conducted preferably at a room temperature.

In the present disclosure, the impregnating is conducted for preferably 1 h to 3 h, more preferably 1.5 h to 2.5 h.

In the present disclosure, the impregnation dispersion is obtained by the impregnating. The impregnation dispersion is subjected to solvent removal. The solvent removal is preferably conducted by rotary evaporation. There is no special requirement for a specific implementation process of the rotary evaporation.

In the present disclosure, a wet material is preferably obtained after most of the polar solvent is removed by the solvent removal. Before the roasting, the wet material is preferably dried to obtain a dry material. Preferably, the dry material is roasted. The drying is conducted at preferably 90° C. to 120° C., more preferably 95° C. to 115° C.

In the present disclosure, the roasting is preferably conducted in a muffle furnace.

In the present disclosure, the roasting is conducted at preferably 400° C. to 600° C., more preferably 450° C. to 550° C. The roasting is conducted for preferably 2 h to 4 h, more preferably 2.5 h to 3.5 h.

In the present disclosure, during the roasting, Fe element in the iron oxide fills oxygen vacancies of the titanium dioxide or reacts with hydroxyl groups on a surface of the titanium dioxide. In this way, the Fe element is anchored on the surface of the titanium dioxide to form a $TiO_2$-doped photocatalyst.

In the present disclosure, the $TiO_2$-doped photocatalyst, an adhesive, a silane coupling agent, a dispersant, a thickener, and water are mixed (hereafter referred to as first mixing) to obtain a photocatalytic slurry.

In the present disclosure, the adhesive is preferably a silica sol, and the silica sol has silica with a mass percentage of preferably 20% to 30%.

In the present disclosure, the silane coupling agent is preferably KH550.

In the present disclosure, the dispersant is preferably sodium hexametaphosphate.

In the present invention, the thickener is preferably polyurethane.

In the present disclosure, the photocatalytic slurry includes preferably the following components in parts by weight: 5 parts to 10 parts of the $TiO_2$-doped photocatalyst, 30 parts to 60 parts of the adhesive, 0.5 parts to 2 parts of the silane coupling agent, 0.2 parts to 0.6 parts of the dispersant, 0.5 parts to 1.2 parts of the thickener, and 5 parts to 12 parts of water, more preferably the following components in parts by weight: 5.5 parts to 8 parts of the $TiO_2$-doped photocatalyst, 32 parts to 55 parts of the adhesive, 0.8 parts to 1.5 parts of the silane coupling agent, 0.3 parts to parts of the dispersant, 0.8 parts to 1 part of the thickener, and 7 parts to 9 parts of water.

In the present disclosure, there is no special requirement on a specific implementation process of the first mixing.

In the present disclosure, the copper slag tailing, cement, a water reducer, and water are mixed (hereafter referred to as second mixing) to obtain a concrete slurry.

In the present disclosure, the cement is specifically ordinary Portland cement.

In a specific example of the present disclosure, the ordinary Portland cement has a strength grade of 42.5.

In the present disclosure, the water reducer is preferably a superplasticizer with a water-reducing rate of greater than 20%.

In the present disclosure, the concrete slurry includes preferably the following components in parts by weight: 60 parts to 80 parts of the copper slag tailing, 10 parts to 18 parts of the cement, parts to 2 parts of the water reducer, and 200 parts to 350 parts of water, more preferably the following components in parts by weight: 65 parts to 75 parts of the copper slag tailing, 12 parts to 15 parts of the cement, 0.5 parts to 1.7 parts of the water reducer, and 220 parts to 330 parts of water.

In the present disclosure, there is no special requirement on a specific implementation process of the second mixing.

In the present disclosure, the photocatalytic slurry, the concrete slurry, and the photocatalytic slurry are poured in sequence into a mold pre-laid with an optical fiber, to form a first photocatalytic slurry layer, a concrete slurry layer, and a second photocatalytic slurry layer that are sequentially laminated, where the optical fiber penetrates the first photocatalytic slurry layer, the concrete slurry layer, and the second photocatalytic slurry layer; and solidification and demolding are conducted to obtain the visible light-catalyzed translucent concrete.

In the present disclosure, the optical fiber is preferably laid perpendicular to a bottom surface of the mold.

In the present disclosure, a solidified material is obtained by the solidification, and first curing is preferably conducted on the solidified material, followed by the demolding. The first curing is conducted at preferably 25° C. and a humidity of preferably 90% for preferably 24 h.

In the present disclosure, an obtained demolded material is preferably subjected to second curing and leveling in sequence to obtain the visible light-catalyzed translucent concrete. The second curing is conducted at preferably 25° C. and a humidity of preferably 90% for preferably 28 d. There is no special requirement for a specific implementation process of the leveling.

In the present disclosure, the preparation method includes the following steps: extracting an iron oxide as a from a copper slag, mixing the iron oxide with $TiO_2$ to obtain a photocatalyst, and then mixing the photocatalyst with an additive to obtain a photocatalytic slurry; preparing a concrete slurry using the copper slag after iron extraction as an aggregate; and pouring the photocatalytic slurry, the concrete slurry, and the photocatalytic slurry in sequence into a mold pre-laid with an optical fiber, to obtain the visible light-catalyzed translucent concrete. In the visible light-catalyzed translucent concrete, iron in the copper slag is used as a raw material of the photocatalyst, and the copper slag after iron extraction is used as an aggregate to replace natural sand and gravel. This solves environmental pollutions caused by the copper slag and realizes resource utilization. Moreover, light transmission of a photocatalytic layer and the optical fiber effectively purifies the air.

The present disclosure further provides a visible light-catalyzed translucent concrete prepared by the preparation method, including a first photocatalytic layer, an intermediate translucent concrete layer, and a second photocatalytic layer that are sequentially laminated, and further including an optical fiber penetrating the first photocatalytic layer, the intermediate translucent concrete layer, and the second photocatalytic layer.

In the present disclosure, the first photocatalytic layer has a thickness of preferably 10 mm to 30 mm, more preferably 15 mm to 25 mm.

In the present disclosure, the second photocatalytic layer has a thickness of preferably 10 mm to 30 mm, more preferably 15 mm to 25 mm.

In the present disclosure, the intermediate translucent concrete layer has a thickness of preferably 150 mm to 450 mm, more preferably 180 mm to 320 mm.

In the present disclosure, the optical fibers are preferably parallel to each other.

In the present disclosure, the optical fiber preferably penetrates vertically the first photocatalytic layer, the intermediate translucent concrete layer, and the second photocatalytic layer.

In the present disclosure, the optical fiber in the visible light-catalyzed translucent concrete has a volume of preferably 15% to 35%.

The present disclosure further provides use of the visible light-catalyzed translucent concrete as a building wall.

In the present disclosure, the iron oxide in the copper slag is recovered as a doping material of the photocatalyst, and the copper slag after iron extraction is used as an aggregate to replace natural sand and gravel for the preparation of translucent concrete. This solves the problem that the copper slag occupies a large area of land, and poisonous precious metals in the copper slag ooze out to cause serious environmental pollutions. Moreover, this fully realizes resource utilization of the copper slag and solidification and stabilization of the heavy metals.

In the present disclosure, the translucent concrete is used as an intermediate layer, and $TiO_2$-doped photocatalytic layers are prepared on both sides of the intermediate layer. In this way, the concrete can utilize sunlight to degrade harmful gases such as $NO_x$, $SO_2$, and HCHO in the air to achieve spontaneous air purification. Meanwhile, a light-transmitting fiber penetrates the visible light-catalyzed translucent concrete, and increases a light-transmitting performance and a decoration effect of the visible light-catalyzing translucent concrete. In addition, the optical fiber conducts light from a light-facing surface to a back-light surface on the translucent concrete, thereby enhancing a purification efficiency of the photocatalytic layers.

In order to further illustrate the present disclosure, the foregoing technical solutions provided by the present disclosure will be described in detail below in conjunction with accompanying drawings and examples, but they should not be construed as limiting the protection scope of the present disclosure.

Example 1

A copper slag and an activator ($Na_2CO_3$) were mixed and ground at a mass ratio of 10:1, and subjected to thermal activation at 1,050° C. for 2 h in a muffle furnace to obtain an activated slag. The activated slag was ground, sieved by a 300-mesh sieve, and sent to a magnetic separator with a magnetic field intensity of 280 kA/m for magnetic separation, to obtain an iron oxide and a copper slag tailing. 20 parts of the iron oxide and 90 parts of $TiO_2$ were dispersed in water. The impregnation was conducted for 3 h according to a total mass of the iron oxide and the titanium dioxide and a volume of water at a ratio of 1 g:40 mL. A resulting impregnated suspension was subjected to rotary evaporation to remove excess water, and dried in an oven at 105° C. An obtained dried sample was roasted in a muffle furnace at 450° C. for 3.5 h to obtain a $TiO_2$-doped photocatalyst.

10 parts of the $TiO_2$-doped photocatalyst, 48 parts of a silica sol (with a silica mass content of 20% to 30%), 1.2 parts of a silane coupling agent (KH550), 0.35 parts of sodium hexametaphosphate, and 0.7 parts of a thickener were mixed evenly with 7 parts of water, to obtain a photocatalytic slurry. 68 parts of the copper slag tailing, 14 parts of cement, and 0.9 parts of a water reducer were mixed with 280 parts of water and then stirred uniformly to obtain a concrete slurry. The photocatalytic slurry was poured into a mold pre-laid with an optical fiber to form a first photocatalytic layer with a thickness of 15 mm. When the first photocatalytic layer was in a semi-solidified state, the concrete slurry was poured to solidify into an intermediate translucent concrete layer with a thickness of 280 mm. The photocatalytic slurry was poured for a second time to form a second photocatalytic layer with a thickness of 15 mm. After each slurry in the mold was completely solidified, first curing was conducted for 24 h at 25° C. and a humidity of 90%. After demolding, second curing was conducted for 28 d at 25° C. and a humidity of 90%. A surface of an obtained material was subjected to leveling, to obtain a visible light-catalyzed translucent concrete. The visible light-catalyzed translucent concrete had a structural schematic view shown in FIG. 1, where the first photocatalytic layer had a thickness of 15 mm, the intermediate translucent concrete layer had a thickness of 280 mm, and the second photocatalytic layer had a thickness of 15 mm. The optical fiber in the visible light-catalyzed translucent concrete had a volume of preferably 25%.

Example 2

A copper slag and an activator (CaO) were mixed and ground at a mass ratio of 10:0.8, and subjected to thermal activation at 1,100° C. for 3 h in a muffle furnace to obtain an activated slag. The activated slag was ground, sieved by a 300-mesh sieve, and sent to a magnetic separator with a magnetic field intensity of 450 kA/m for magnetic separation, to obtain an iron oxide and a copper slag tailing. 15 parts of the iron oxide and 100 parts of $TiO_2$ were dispersed in water. The impregnation was conducted for 2 h according to a total mass of the iron oxide and the titanium dioxide and a volume of water at a ratio of 1 g:40 mL. A resulting impregnated suspension was subjected to rotary evaporation to remove excess water, and dried in an oven at 90° C. An obtained dried sample was roasted in a muffle furnace at 550° C. for 2 h to obtain a TiO$_2$-doped photocatalyst.

8 parts of the TiO$_2$-doped photocatalyst, 42 parts of a silica sol (with a silica mass content of 20% to 30%), 1.5 parts of a silane coupling agent (KH550), 0.4 parts of sodium hexametaphosphate, and 0.5 parts of a thickener were mixed evenly with 9 parts of water, to obtain a photocatalytic slurry. 75 parts of the copper slag tailing, 12 parts of cement, and 1.5 parts of a water reducer were mixed with 300 parts of water and then stirred uniformly to obtain a concrete slurry. The photocatalytic slurry was poured into a mold pre-laid with an optical fiber to form a first photocatalytic layer with a thickness of 10 mm. When the first photocatalytic layer was in a semi-solidified state, the concrete slurry was poured to solidify into an intermediate translucent concrete layer with a thickness of 300 mm. The photocatalytic slurry was poured for a second time to form a second photocatalytic layer with a thickness of 10 mm. After each slurry in the mold was completely solidified, first curing was conducted for 24 h at 25° C. and a humidity of 90%. After demolding, second curing was conducted for 28 d at 25° C. and a humidity of 90%. A surface of an obtained material was subjected to leveling, to obtain a visible light-catalyzed translucent concrete. The visible light-catalyzed translucent concrete had a structural schematic view shown in FIG. 1, where the first photocatalytic layer had a thickness of 10 mm, the intermediate translucent concrete layer had a thickness of 300 mm, and the second photocatalytic layer had a thickness of 10 mm. The optical fiber in the visible light-catalyzed translucent concrete had a volume of preferably 25%.

Example 3

A copper slag and an activator (Na$_2$CO$_3$) were mixed and ground at a mass ratio of 10:2, and subjected to thermal activation at 1,000° C. for 3 h in a muffle furnace to obtain an activated slag. The activated slag was ground, sieved by a 300-mesh sieve, and sent to a magnetic separator with a magnetic field intensity of 1,300 kA/m for magnetic separation, to obtain an iron oxide and a copper slag tailing. 30 parts of the iron oxide and 100 parts of TiO$_2$ were dispersed in water. The impregnation was conducted for 2 h according to a total mass of the iron oxide and the titanium dioxide and a volume of water at a ratio of 1 g:40 mL. A resulting impregnated suspension was subjected to rotary evaporation to remove excess water, and dried in an oven at 90° C. An obtained dried sample was roasted in a muffle furnace at 550° C. for 2 h to obtain a TiO$_2$-doped photocatalyst.

6 parts of the TiO$_2$-doped photocatalyst, 42 parts of a silica sol (with a silica mass content of 20% to 30%), 1.5 parts of a silane coupling agent (KH550), 0.4 parts of sodium hexametaphosphate, and 0.8 parts of a thickener were mixed evenly with 11 parts of water, to obtain a photocatalytic slurry. 60 parts of the copper slag tailing, 18 parts of cement, and 1.5 parts of a water reducer were mixed with 320 parts of water and then stirred uniformly to obtain a concrete slurry. The photocatalytic slurry was poured into a mold pre-laid with an optical fiber to form a first photocatalytic layer with a thickness of 20 mm. When the first photocatalytic layer was in a semi-solidified state, the concrete slurry was poured to solidify into an intermediate translucent concrete layer with a thickness of 250 mm. The photocatalytic slurry was poured for a second time to form a second photocatalytic layer with a thickness of 20 mm. After each slurry in the mold was completely solidified, first curing was conducted for 24 h at 25° C. and a humidity of 90%. After demolding, second curing was conducted for 28 d at 25° C. and a humidity of 90%. A surface of an obtained material was subjected to leveling, to obtain a visible light-catalyzed translucent concrete. The visible light-catalyzed translucent concrete had a structural schematic view shown in FIG. 1, where the first photocatalytic layer had a thickness of 20 mm, the intermediate translucent concrete layer had a thickness of 250 mm, and the second photocatalytic layer had a thickness of 20 mm. The optical fiber in the visible light-catalyzed translucent concrete had a volume of preferably 25%.

Comparative Example 1

A copper slag was ground, and subjected to roasting at 1,200° C. for 3 h in a muffle furnace to obtain an activated slag. The activated slag was ground, sieved by a 300-mesh sieve, and sent to a magnetic separator with a magnetic field intensity of 280 kA/m for magnetic separation, to obtain an iron oxide and a copper slag tailing.

8 parts of the TiO$_2$, 42 parts of a silica sol (with a silica mass content of 20% to 30%), 1.5 parts of a silane coupling agent (KH550), 0.4 parts of sodium hexametaphosphate, and 0.5 parts of a thickener were mixed evenly with 8 parts of water, to obtain a photocatalytic slurry. 75 parts of the copper slag tailing, 12 parts of cement, and 1.5 parts of a water reducer were mixed with 300 parts of water and then stirred uniformly to obtain a concrete slurry. The photocatalytic slurry was poured into a mold pre-laid with an optical fiber to form a first photocatalytic layer with a thickness of 10 mm. When the first photocatalytic layer was in a semi-solidified state, the concrete slurry was poured to solidify into an intermediate translucent concrete layer with a thickness of 250 mm. The photocatalytic slurry was poured for a second time to form a second photocatalytic layer with a thickness of 10 mm. After each slurry in the mold was completely solidified, first curing was conducted for 24 h at 25° C. and a humidity of 90%. After demolding, second curing was conducted for 28 d at 25° C. and a humidity of 90%. A surface of an obtained material was subjected to leveling, to obtain a visible light-catalyzed translucent concrete.

Test Example

For the visible light-catalyzed translucent concretes prepared in Examples 1 to 3 and Comparative Example 1, a compressive strength was tested with a fully automatic compressive and flexural testing machine, and a leaching toxicity was tested under acid treatments.

The test results of the compressive and flexural strength of the visible light-catalyzed translucent concretes prepared in Examples 1 to 3 and Comparative Example 1 were shown in Table 1 and Table 2.

TABLE 1

| Test results of compressive and flexural strength of visible light-catalyzed translucent concretes prepared in Examples 1 to 3 and Comparative Example 1 | | | | |
| --- | --- | --- | --- | --- |
| Item | Example 1 | Example 2 | Example 3 | Comparative Example 1 |
| 28 d compressive strength (MPa) | 47.42 | 42.28 | 40.97 | 28.47 |
| 28 d flexural strength (MPa) | 7.8 | 7.5 | 6.9 | 5.8 |

TABLE 2

Test results of acid leaching toxicity of visible light-catalyzed translucent
concretes prepared in Examples 1 to 3 and Comparative Example 1

| Metal | National standard concentration limit | Example 1 | Example 2 | Example 3 | Comparative Example 1 |
|---|---|---|---|---|---|
| Cu (mg/L) | 100 | 0.163 | 0.212 | 0.264 | 1.721 |
| Zn (mg/L) | 100 | 0.402 | 0.642 | 1.265 | 4.417 |
| Pb (mg/L) | 5 | 0.187 | 0.224 | 0.269 | 0.738 |
| Zn (mg/L) | 5 | 0.174 | 0.229 | 0.225 | 0.295 |

The visible light-catalyzed translucent concretes prepared in Examples 1 to 3 and Comparative Example 1 were placed in a self-made photocatalytic fixed-bed reactor, and then fed with formaldehyde and $O_2$ to detect a concentration of formaldehyde at the import and export. In this way, a photocatalytic efficiency of the visible light-catalyzed translucent concretes prepared in Examples 1 to 3 and Comparative Example 1 was characterized, and the results were shown in Table 3.

TABLE 3

Photocatalytic efficiency of visible light-catalyzed translucent
concretes prepared in Examples 1 to 3 and Comparative Example 1

| Item | Example 1 | Example 2 | Example 3 | Comparative Example 1 |
|---|---|---|---|---|
| Formaldehyde degradation rate (%) | 46.3 | 38.7 | 32.1 | 7.4 |

In summary, a visible light-catalyzed translucent concrete is prepared by the preparation method provided by the present disclosure. This material has an intermediate translucent concrete layer prepared from copper slag, a photocatalytic layer prepared on both the front and back sides of the intermediate translucent concrete layer, and a light-transmitting fiber vertically penetrating the entire visible light-catalyzed translucent concrete. In the present disclosure, the preparation method includes: extracting an iron oxide as from a copper slag, mixing the iron oxide with $TiO_2$ to obtain a photocatalyst, and then mixing the photocatalyst with an additive to obtain a photocatalytic slurry; preparing a concrete slurry using the copper slag after iron extraction as an aggregate; and pouring the photocatalytic slurry, the concrete slurry, and the photocatalytic slurry in sequence into a mold pre-laid with an optical fiber, to obtain the visible light-catalyzed translucent concrete. Iron in the copper slag is used as a doping agent of the photocatalyst, and the copper slag after iron extraction is used as an aggregate to replace natural sand and gravel. This solves environmental pollutions caused by the copper slag and realizes resource utilization. The photocatalytic layer can utilize sunlight to degrade harmful gases such as $NO_x$, $SO_2$, and HCHO in the air, and the optical fiber can increase a light intensity of the backlight surface, thereby effectively purifying the air.

Although the present disclosure is described in detail in conjunction with the foregoing examples, they are only a part of, not all of, the examples of the present disclosure. Other examples can be obtained based on these examples without creative efforts, and all of these examples shall fall within the protection scope of the present disclosure.

What is claimed is:

1. A preparation method of a visible light-catalyzed translucent concrete, comprising the following steps:

mixing and grinding a copper slag and an alkaline activator to obtain a mixture, and heating the mixture to conduct thermal activation to obtain an activated slag;

subjecting the activated slag to magnetic separation to obtain an iron oxide and a copper slag tailing;

impregnating the iron oxide and titanium dioxide in a polar solvent to obtain an impregnation dispersion, removing the solvent from the impregnation dispersion, and conducting roasting to obtain a $TiO_2$-doped photocatalyst;

mixing the $TiO_2$-doped photocatalyst, an adhesive, a silane coupling agent, a dispersant, a thickener, and water to obtain a photocatalytic slurry;

mixing the copper slag tailing, cement, a water reducer, and water to obtain a concrete slurry; and pouring the photocatalytic slurry, the concrete slurry, and the photocatalytic slurry in sequence into a mold pre-laid with an optical fiber, to form a first photocatalytic slurry layer, a concrete slurry layer, and a second photocatalytic slurry layer that are sequentially laminated, wherein the optical fiber penetrates the first photocatalytic slurry layer, the concrete slurry layer, and the second photocatalytic slurry layer; and conducting solidification and demolding to obtain the visible light-catalyzed translucent concrete.

2. The preparation method according to claim 1, wherein the alkaline activator comprises an alkali metal carbonate and/or an alkaline earth metal oxide; and the copper slag and the alkaline activator are at a mass ratio of 10:(0.5-2).

3. The preparation method according to claim 2, wherein the thermal activation is conducted at 900° C. to 1,200° C. for 1 h to 3 h.

4. The preparation method according to claim 1, wherein the thermal activation is conducted at 900° C. to 1,200° C. for 1 h to 3 h.

5. The preparation method according to claim 1, wherein the magnetic separation is conducted at a magnetic field intensity of 160 kA/m to 480 kA/m.

6. The preparation method according to claim 1, wherein the iron oxide and the titanium dioxide are at a mass ratio of (10-30):(80-110); the impregnating is conducted for 1 h to 3 h; and the roasting is conducted at 400° C. to 600° C. for 2 h to 4 h.

7. The preparation method according to claim 1, wherein the photocatalytic slurry comprises the following components in parts by weight:

5 parts to 10 parts of the $TiO_2$-doped photocatalyst, 30 parts to 60 parts of the adhesive, 0.5 parts to 2 parts of the silane coupling agent, 0.2 parts to 0.6 parts of the dispersant, 0.5 parts to 1.2 parts of the thickener, and 5 parts to 12 parts of water.

8. The preparation method according to claim 1, wherein the concrete slurry comprises the following components in parts by weight:

60 parts to 80 parts of the copper slag tailing, 10 parts to 18 parts of the cement, 0.3 parts to 2 parts of the water reducer, and 200 parts to 350 parts of water.

9. A method for preparing a building wall using the visible light-catalyzed translucent concrete prepared by the preparation method according to claim 1.

10. The method according to claim 9, wherein the first photocatalytic layer and the second photocatalytic layer have independently a thickness of 10 mm to 30 mm, and the intermediate translucent concrete layer has a thickness of 150 mm to 450 mm.

\* \* \* \* \*